United States Patent [19]

Dempsey

[11] 4,435,143
[45] Mar. 6, 1984

[54] SMALL BLANK FEEDER AND TRAY FORMER

[75] Inventor: Edmond N. Dempsey, Marion, Ind.

[73] Assignee: Peerless Machine & Tool Corporation, Marion, Ind.

[21] Appl. No.: 382,716

[22] Filed: May 27, 1982

[51] Int. Cl.³ .................. B29C 17/00; B29C 1/00
[52] U.S. Cl. ...................... 425/150; 72/419;
   72/452; 74/50; 425/214; 425/397; 425/400;
   493/902
[58] Field of Search .............. 425/157, 324.1, 325,
   425/339, 340, 383, 384, 385, 214, 317, 394, 398,
   402, 451.4, DIG. 5, 156, 340, 397, 400, 150;
   100/215, 45, 48, 51; 72/452, 419, 424, 426;
   493/122, 124, 126, 125, 902, 338; 74/49, 50, 55;
   192/85 C, 85 CA; 198/339; 271/273, 274;
   101/232

[56] References Cited

U.S. PATENT DOCUMENTS

| | | | |
|---|---|---|---|
| 1,037,844 | 9/1912 | Adriance et al. | 72/424 |
| 1,162,302 | 11/1915 | Moffet | 72/424 |
| 1,207,390 | 12/1916 | Frahm | 72/426 |
| 1,661,248 | 3/1928 | Barbieri | 493/902 |
| 1,780,012 | 10/1930 | Fine | 72/424 |
| 1,962,872 | 6/1934 | Moon | 72/424 |
| 2,243,206 | 5/1941 | Hall | 74/50 |
| 2,275,758 | 3/1942 | Harris | 192/85 C |
| 2,632,643 | 3/1953 | Egan et al. | 271/274 |
| 2,891,644 | 6/1959 | Davis | 192/85 CA |
| 3,096,692 | 7/1963 | Crathern | 425/340 |
| 3,448,608 | 6/1969 | Finsterwald | 72/424 |
| 3,659,993 | 5/1972 | Brown | 425/214 |
| 3,754,705 | 8/1973 | Wiig | 100/215 |
| 3,948,162 | 4/1976 | Numba | 72/419 |
| 4,056,186 | 11/1977 | Hill | 198/339 |
| 4,057,380 | 11/1977 | Hosoe | 425/398 |
| 4,158,539 | 6/1979 | Arends | 425/398 |
| 4,170,621 | 10/1979 | Kiefer | 425/394 |
| 4,212,614 | 7/1980 | Holzinger | 425/214 |
| 4,255,382 | 3/1981 | Arends | 425/398 |
| 4,355,530 | 10/1982 | Chen | 72/452 |

FOREIGN PATENT DOCUMENTS

| | | | |
|---|---|---|---|
| 2452050 | 5/1976 | Fed. Rep. of Germany | 101/232 |
| 3141 | 6/1919 | Netherlands | 101/232 |
| 53183 | 4/1967 | Poland | 271/273 |
| 1538476 | 1/1979 | United Kingdom | 72/452 |

*Primary Examiner*—Willard E. Hoag
*Attorney, Agent, or Firm*—Barnes & Thornburg

[57] ABSTRACT

A press includes a frame, a flywheel, a motor for driving the flywheel, and a shaft. A clutch is provided which is actuable for engaging the shaft to the flywheel. An eccentric is journaled upon the shaft and rotates therewith. The eccentric rotates in a block which is slidably mounted in a head to permit the block to move laterally within the head. The head is vertically movable in response to vertical movements of the block. The press also includes an upper die which is mounted on the head and a lower die which is resiliently supported upwardly on a base. Movement of the head engages and disengages the upper die and lower die.

31 Claims, 10 Drawing Figures

SMALL BLANK FEEDER AND TRAY FORMER

This invention relates to devices employing dies to form sheet material into three-dimensional objects, and more particularly, to a press having a selectively variable dwell time and stroke rate.

The art of forming sheet material, such as paper stock and polystyrenes, into three-dimensional containers such as plates, food trays, and clamshell containers is known, as are the conventional presses which form the containers. A conventional press includes a pair of dies which are movable between an engaged and a disengaged position. Unformed sheet material is inserted between the two dies, and the dies are then brought into engagement. They are held in engagement with each other for a period of time (herein referred to as the dwell time) during which the three-dimensional container is formed. The dies are then separated, and the formed container is ejected from between the dies.

An electric motor normally runs the press which raises and lowers the dies. Typically, the press contains a cam and follower arrangement which translates the rotational movement of the motor into the linear movement of the die head. The dwell time during which the dies are in engagement is usually determined by the shape and surface length of the cam. In order to change the dwell time, it is usually necessary to change the cam, which can be a rather time-consuming process.

One other difficulty associated with the use of conventional cam and follower arrangements is that once the dies move into engagement, they stay engaged throughout the cam's entire dwell profile.

Container manufacturers are often called upon to make a wide variety of containers having different size shape and material composition. Usually, a change in the type of container being manufactured entails a certain amount of expense in adapting the press to form the different container. The adaptation, or set up, usually involves a change of dies and often a change in the dwell time. In order to properly form a container, a dwell time must be selected which will allow the dies sufficient time to form a container of that particular size and shape. Additionally, dwell time selection is dependent upon the composition of the material being formed. For example, a different dwell time may be required to form a polystyrene container than to form a similarly shaped paper container. Also, different batches of the same material may require different dwell times to properly form identical containers. One factor which influences the dwell time required is the moisture content of the batch of material being formed.

A further problem associated with machines presently on the market is that most container-forming presses tend to be large and expensive machines. Although these machines can be very cost-effective when employed to make large runs of identical containers, they often become rather cost-ineffective when employed to make small runs of containers of varied size, shape, or material.

Another outgrowth of these older, larger machines being designed primarily for large runs is that the design of these machines does not permit the user to change dies quickly or to gain access easily to parts requiring servicing.

Another difficulty associated with the older, larger machines is that the large capital investment required to purchase or lease the older, larger machines often precluded smaller operations from purchasing enough machines to enable them to simultaneously produce different containers.

These and other difficulties with prior machines are overcome by the present invention wherein a press includes a frame, a flywheel, a motor for driving the flywheel, and a mechanism to couple the motor to the flywheel. A shaft is provided which is coaxial with the flywheel and selectively engageable therewith. A clutch is actuable for engaging the shaft to the flywheel. Normally, the clutch is a fluid-actuable clutch, and relies on air pressure to engage and release its mechanical couplings. Further, the press includes an upper die and a lower die. An eccentric drive, such as a scotch yoke, is provided for drivingly connecting the upper die to the shaft. The action of the shaft and the eccentric drive move the upper die into and out of engagement with the lower die. The lower die is resiliently mounted upwardly on a normally stationary base.

One feature of the instant invention is that through the applicant's flywheel, clutch, and eccentric drive mechanism, the dwell time and stroke rate of the press are easily changed, thereby reducing the down time of the machine caused by the set-up time required to adapt the press to a different type of container.

Another feature of the invention resides in the frame which is designed to facilitate servicing of the press and changing of the dies. Movable entry and exit conveyors are also provided which facilitate servicing of the press.

Another feature of the invention is the adaptability of the press so as to be used singly or in combination with a plurality of other similar presses. Multiple presses can be driven from a single power source, while retaining the selective controllability of each individual press.

Another feature of this press is that since it can be produced less expensively than many conventional presses, and is designed to be used singly or in combination with other presses, smaller operators can initially purchase one press, and add others as their volume increases.

These and other features of this invention and their inherent advantages will become apparent to those skilled in the art from the following description of preferred embodiments and the accompanying drawings illustrating the best mode of carrying out the invention, wherein.

Figure 1:
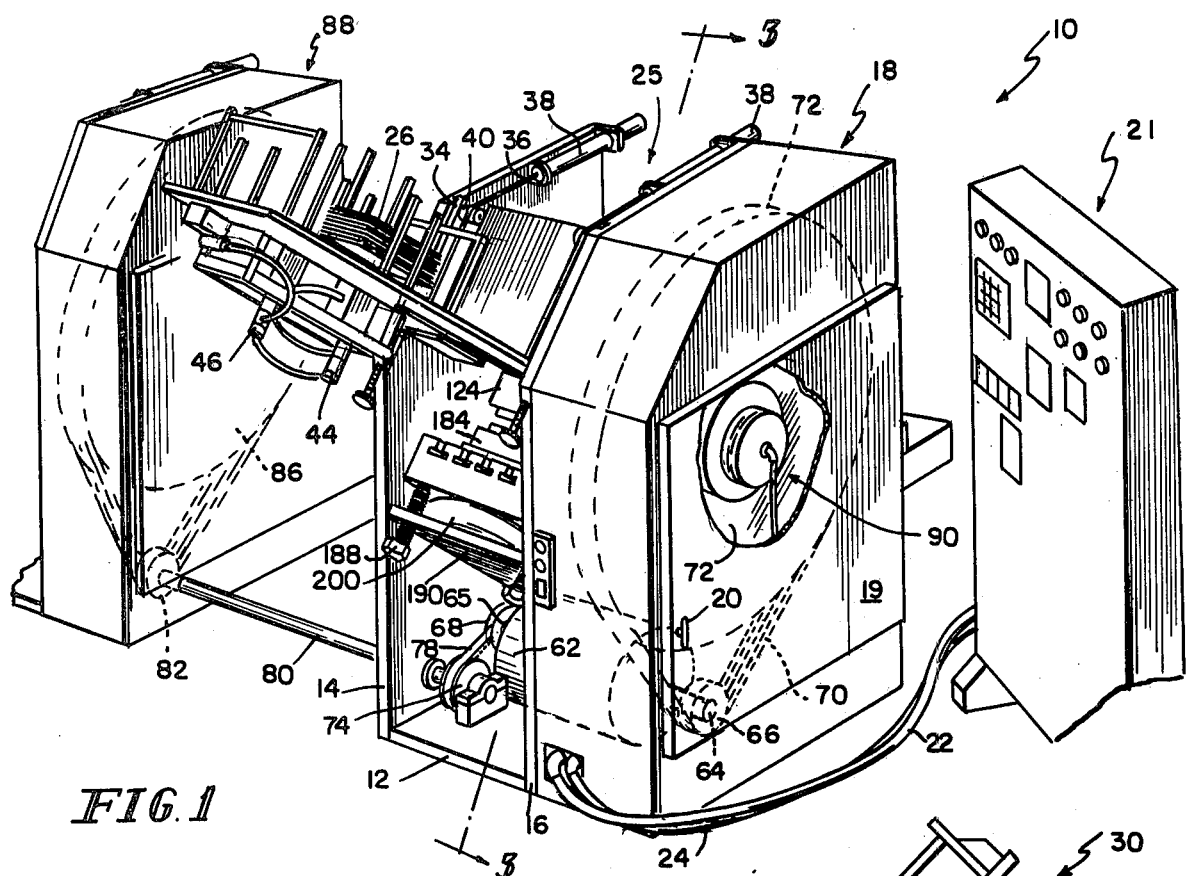
FIG. 1 is a perspective view, partially cut away, of the invention.
Figure 2:
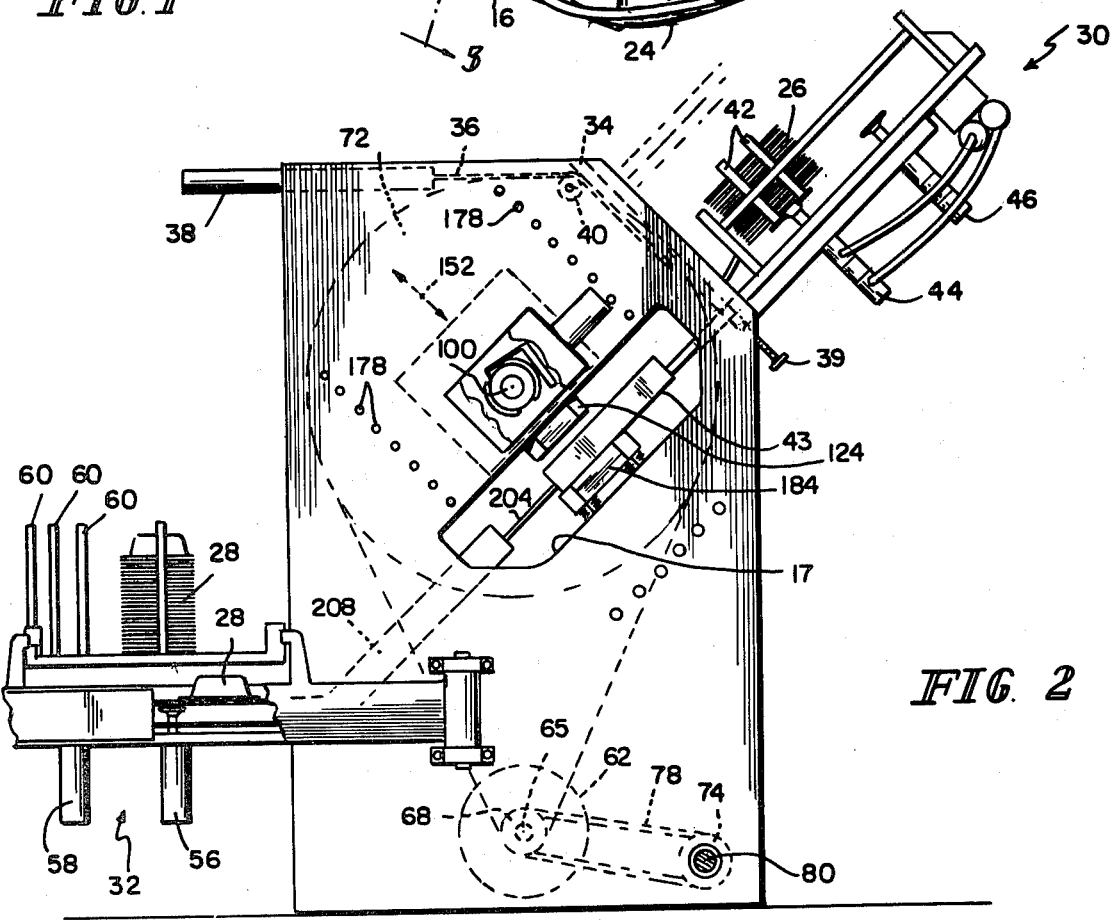
FIG. 2 is a side view, partially cut away, of the invention.
Figure 3:
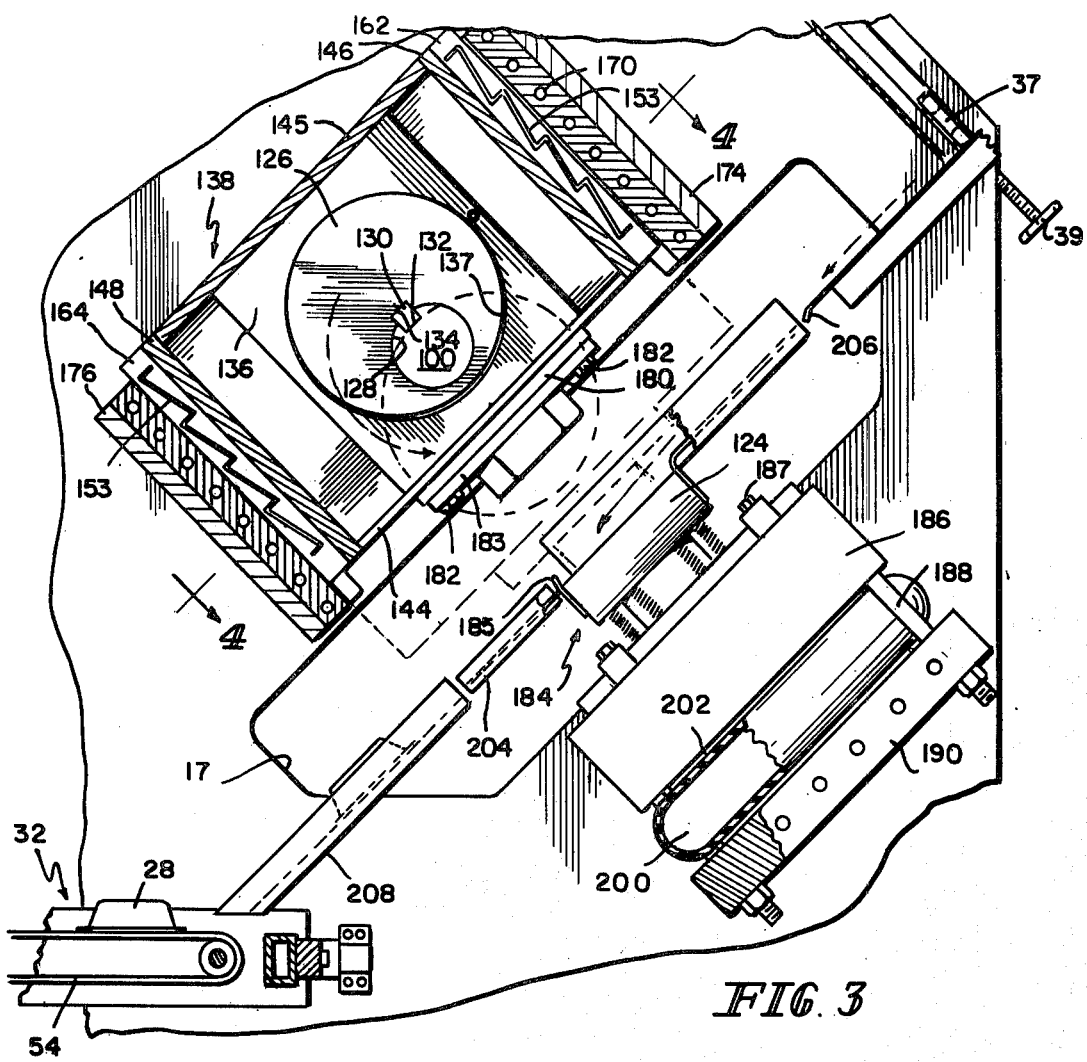
FIG. 3 is a cross-sectional view of the invention, taken along lines 3—3 of FIG. 1.

Referring now to FIGS. 1-3, a press 10 includes a base 12, an upstanding wall 14 at one end of the base, and an upstanding wall 16 near the middle of the base 12. The walls 14, 16 and base 12 are preferably constructed of rather substantial hot-rolled plate in order to withstand the pressures exerted upon them by the press components supported on them, and the forces exerted by the press 10 in operation. Upstanding wall 14 further includes an opening 17 through which an operator can gain access to the pressing area 25.

Contiguous with wall 16 is housing 18 which includes a hingedly mounted door 19 having a handle 20 and latch (not shown) which enable the user to gain access to the inside of the housing 18 for servicing, but which protect the components inside the housing 18 when the door 19 is closed. A free-standing control panel 21 which communicates with the press 10 through umbillicals 22, 24 contains a plurality of controls through which the operator controls the actions of the press and adjusts such variables as stroke rate and dwell time, counters by which the operator keeps track of press 10 production, and microprocessors which are in communication with various components of the press. The microprocessors receive input from the various components and direct commands to various components based upon the operator's requests and the input received from the various components. A compressed air source (not shown) provides air to the press to operate and actuate the parts of the press which are air-driven or actuated.

Between the upstanding walls 14, 16 of the press 10 is the pressing area 25 wherein blanks 26 are formed into containers 28. Precut blanks 26 are stacked onto an entrance conveyor 30 where they are individually moved into the pressing area 25, and then removed by, and stacked on, an exit conveyor 32. Entrance 30 and exit 32 conveyors are both movable to enable an operator to gain access to the pressing area 25 when servicing components therein. Entrance conveyor 30 is pulled upwardly and released downwardly by cables 36 which guide rollers 37 along tracks 34. Cables 36 are pulled over pulleys 40 in order to move the entrance conveyor 30 with a force in the same direction as the tracks 34 run. The cables 36 are actuated by pneumatic pistons 38. Adjustable levelers 39 are threadably engaged into the lower extremities of tracks 34. The levelers 39 are inserted into the tracks 34 to halt downward movement of the entrance conveyor 30 during times when the entrance conveyor 30 is being lowered into the operating position. The operator can adjust the levelers 39 to ensure that when the entrance conveyor 30 is lowered into its operating position, it will be in vertical alignment with feeding chute 43. FIG. 1 shows the entrance conveyor 30 in a partially raised position, and FIG. 2 shows the conveyor 30 in a lowered operating position. The entrance conveyor 30 further includes upstanding guide rods 42 which serve to position the blanks 26 for feeding them into the pressing area 25 and also serves to maintain the blanks 26 in a neat stack. The position of guide rods 42 is laterally and longitudinally adjustable in order to accommodate different-sized blanks 26. The blanks 26 are moved individually into the pressing area 25 by the action of pickups 44, 46. An additional pickup (not shown) can be added on the entrance conveyor 30 to serve as an interemediate blank 26 stop between the stack and the pressing area 25. The inclined angle of the entrance conveyor 30 allows the blanks 26 to fall into the pressing area 25 under the influence of gravity. The blanks 26 which are formed by this press 10 are precut and, if necessary, prescored.

Figure 5:
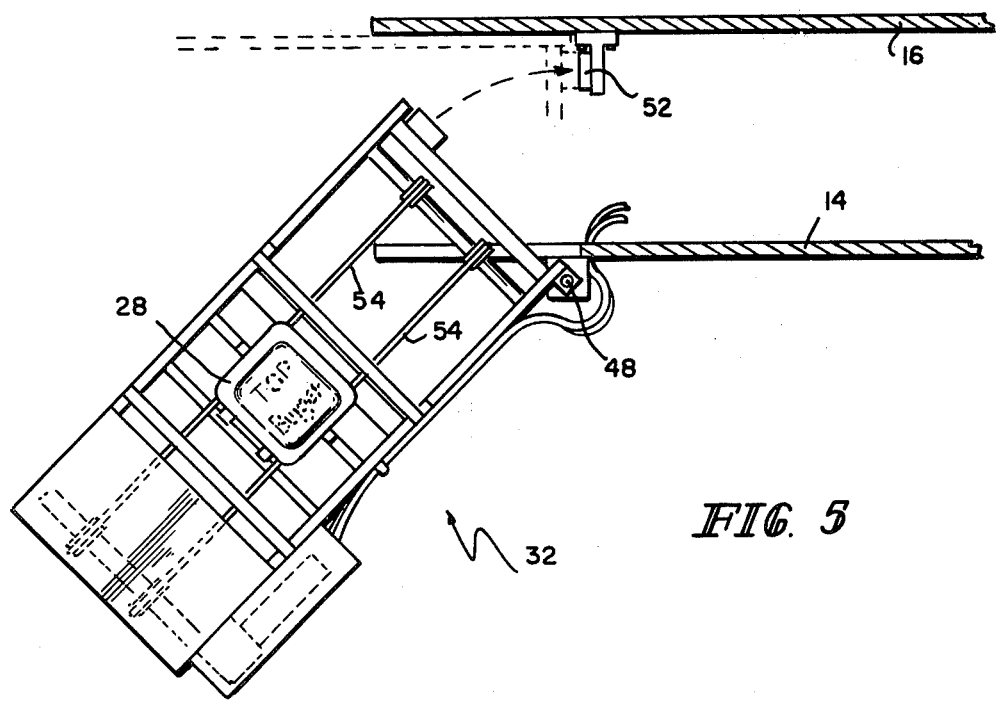
FIG. 5 is a partial plan view of the invention illustrating the swing-away feature of the exit conveyor.
Figure 6:
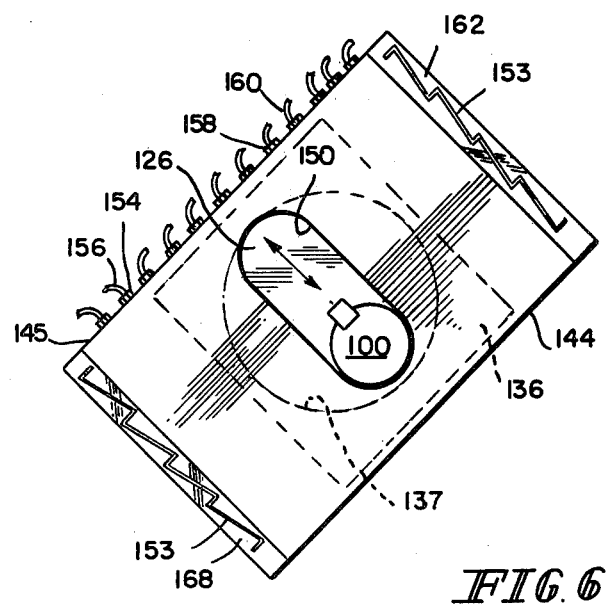
FIG. 6 is a side view of the invention showing the moving head and associated parts.

As best shown in FIGS. 1, 2, and 5, exit conveyor 32 is hingedly mounted on hinge 48 which allows the conveyor 32 to be swung aside and thus provide an operator or serviceman with easy access into the pressing area 25. A metallic plate 50 and magnet 52 serve to secure the exit conveyor 32 in place when the press 10 is not being serviced. Exit conveyor 32 further includes a pair of conveyor belts 54 for moving the formed containers 28 to the end of the conveyor, pickups 56, 58 for stacking the formed containers 28, and guide rods 60 for maintaining the formed containers 28 in a neat stack. The position of guide rods 60 is laterally and longitudinally adjustable.

Figure 4:
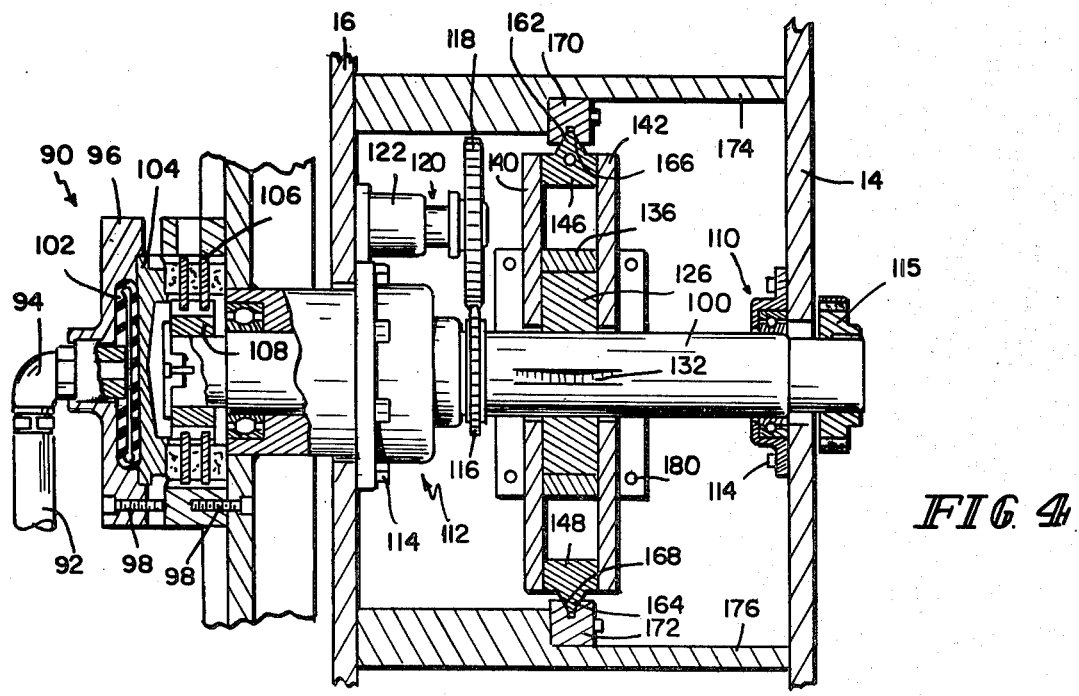
FIG. 4 is a cross-sectional view of the invention taken along lines 4—4 of FIG. 3.

Referring now to FIGS. 1 and 4, an electric motor 62 includes output shaft 64 and output shaft 65, each of which turns a pulley 66, 68, respectively. The motor 62 is preferably at least 3 hp if driving a single press, and more powerful if driving multiple presses. Pulley 66 turns a belt 70 which partially surrounds the outer surface of flywheel 72, thereby rotating flywheel 72 in the same direction as pulley 66. Pulley 68 rotates pulley 74 via a belt 78. The rotation of pulley 68 in turn rotates jackshaft 80 which, through pulley 82 and belt 84, rotates flywheel 86 of adjacent press 88. Several other presses can be run in a line through common jackshaft 80. In a preferred embodiment, the exposed portion of jackshaft 80 between adjacent presses 10, 88 is enclosed in a housing (not shown). Press 88 is also provided with a control panel (not shown) similar to control panel 20 so that presses 10, 88 can be individually controlled, thereby allowing the operator to form different containers on presses operated off the common jackshaft 80.

Air tube disk clutch 90 is secured to flywheel 86 so that the driving elements of the clutch 90 rotate coaxially with the flywheel 86. Clutch 90 is a preferably multiple plate clutch which is air-actuated via hose 92 which is rotatably mounted in the clutch 90 by connector 94. This allows the clutch housing 96 to rotate while permitting the air hose 92 to remain stationary. Clutch housing 96 is secured to flywheel 86 by a plurality of bolts 98. In the clutch 90 shown in FIG. 4, the clutch is engaged to the shaft 100 by pumping air under pressure into the air bladder 102, causing the bladder 102 to expand against pressure plate 104. The movement of pressure plate 104 forces the driving disks 106 into frictional engagement with the driven plates 108 which are coupled to the driven shaft 100.

Preferably, release springs (not shown) act to bias the driving disks 106 out of engagement with the driven plates 108 to minimize friction and contact between the driving disks 106 and driven plates 108 when the clutch 90 is disengaged from the shaft 100.

The clutch 90 is biased to be normally disengaged from shaft 100, and engages the shaft 100 only upon command. Shaft 100 is journaled on bearings 110, 112, the outer housings of which are securely attached by bolts 114 to the inside of walls 14, 16, respectively. The shaft 100 must be strong enough to support the weight of the clutch 90, flywheel 86, and other components. The bearings 110, 112 and bolts 114 must be strong enough to support the shaft 100 and the components supported by the shaft.

Brake 115 is mounted to the outer surface of wall 14 and is positioned proximate to shaft 100 to engage shaft 100. Press 10 will operate and will form containers 28 (however) without the need of a brake 115. In the preferred embodiment, brake 115 is spring-biased to normally be in engagement with shaft 100. The brake 115 includes an air release which, when applied, has sufficient strength to release the brake 115 from its spring-biased engagement with shaft 100, thereby allowing shaft 100 to rotate freely. The brake 115 engages shaft 100 when the press 10 is not running, and at any time during operation of the press 10 when the clutch 90 is disengaged from the shaft 100. The brake 115 is only released from engagement with the shaft 100 when the clutch 90 is engaged to the shaft 100.

Collared onto the shaft 100 is pinion gear 116 which rotates with shaft 100 and meshes with spur gear 118. Spur gear 118 is collared upon input shaft 120 of a rotary transducer 122. Rotary transducer 122 is in communication with the control panel 21 to inform the control panel 21 of the rotational position of the shaft 100. As will be discussed below, the rotational position of the shaft 100 is directly translatable into the vertical position of the upper die 124. The rotary transducer 122 is thereby capable of informing the control panel 21 of the vertical position of the upper die 124.

Referring now to FIGS. 1, 3, and 4, an eccentric 126 is collared onto the shaft 100 through an opening 128 in the eccentric 126. The eccentric 126 is generally circular in shape. Opening 128 is offset from the center of the eccentric 126, thereby causing the diameter of the rotational path of eccentric 126 to be larger than the diameter of the eccentric 126. The eccentric 126 maintains its relative rotational position upon the shaft 100 by the insertion of a key 130 into corresponding openings 132, 134 of the shaft 100 and eccentric 126, respectively.

The eccentric 126 rotates coaxially with the shaft 100 in block 136. The exterior of block 136 is substantially rectangular in shape, having exterior length and width dimensions which are approximately equal to each other. Block 136 contains a generally circular opening 137, sized to slidably receive eccentric 126, and within which eccentric 126 rotates, imparting an eccentric path of travel to block 136, which results in reciprocating movement of head 138, within which block 136 is slidably contained. The block 136 is approximately as thick as eccentric 126. Head 138 includes side plates 140, 142, bottom plate 144, top plate 145, front plate 146, and rear plate 148. Side plates 140, 142 each include oblong-shaped openings 150 having their longest dimension in a direction parallel to arrow 152, shown in FIG. 2. The oblong-shaped openings 150 are provided in the side plates 140, 142 to provide clearance for the shaft 100 as the head travels in the directions indicated by arrow 152. Top plate 145 includes an inlet port 154 for lubricant line 156 and an outlet port 158 for lubricant line 160 through which lubricant is circulated in the area between the inner surfaces of the head 138 and the outer surfaces of the block 136, and also in the area between the inner surface of the block 136 and outer surface of the eccentric 126.

Front plate 146 and rear plate 148 include V-shaped tongues 162, 164 which are sized to be slidably received by V-shaped grooves 166, 168 cut in longitudinal bars 170, 172, all of which extend in a direction parallel to that indicated by arrow 152. Grease grooves 153 are provided on V-shaped tongues 162, 164 to retain lubricant and thereby reduce friction between the V-shaped tongues 162, 164 and the V-shaped grooves 166, 168. The retention of lubricant enhances the slidability of the tongues 162, 164 along the V-shaped grooves 166, 168. Longitudinal bars 170, 172 are securely attached to planar cross members 174, 176, respectively. Planar cross members 174, 176 extend between walls 14, 16 and are securely attached thereto by bolts 178.

Attached to bottom plate 144 is die mounting plate 180, to which the upper die 124 is removably secured by bolts 182. Preferably, mounting plate 180 is of a universal type which will fit most or all of the dies 124 commonly used in the industry.

The upper portion 183 of upper die 124 can be equipped with heating elements (not shown) which serve to heat the upper die 124 and thereby quicken the formation of flat blanks 26 into formed containers 28. In the preferred embodiment, upper die 124 includes air jets (not shown) which prevent the formed containers 28 from sticking to the upper die 124 after being pressed thereby.

Lower die 184 is mounted onto floating base 186 by bolts 187. Lower die 184 illustrated in FIGS. 1 and 3 is a telescoping die. Floating base 186 may be equipped with heating elements (not shown) to facilitate formation of containers 28. Mounted to lower die 184 are a pair of upstanding stops 185 which are sized and positioned to stop a blank 26 from sliding past the lower die 184, but to allow a formed container to slide therethrough.

The width of a formed container 28 having raised portions is generally narrower than the flattened blank 26 from which it is formed, thereby allowing a formed container 28 to slide through an opening through which a blank 26 would not pass.

Floating base 186 is slidably mounted on support rods 188 to stationary base 190, such that position of the floating base 186 is vertically movable. Interposed between floating base 186 and stationary base 190 is air cushion 200 upon which the floating base 186 rests and which preferably is constructed out of a thick pliable rubber which is strong enough to withstand the pressure exerted on it by the floating base 186 and lower die 184 through the action of the upper die 124.

Air cushion 200 also serves to counteract the force of gravity by biasing floating base 186 away from stationary base 190. When a heating element is used in either the upper die 124, lower die 184, or floating base 186, an insulating sheet 202 should be interposed between the floating base 186 and the air cushion 200. The insulating sheet 202 helps to retard premature cracking and drying of the rubber in air cushion 200, and aids in preventing rupture of air cushion 202 caused by the rubber in the air cushion 200 becoming melted due to the heat of the floating base 186.

Feeding chute 43 and exit chute 204 are mounted onto lower die 184 and are vertically movable therewith. Entrance chute 206 and exit chute 208 are stationarily mounted to one or both of upstanding walls 14, 16. Alternate feeding chute 43 and removing chute 204 can be lengthened to, in the case of the feeding chute 43, capture blanks 26 directly from the entrance conveyor 30, and in the case of the removing chute 204, to deliver formed containers 28 directly to the exit conveyor 32. An opening is provided in upstanding wall 14 to enable the operator to gain access to the pressing area 25 to change the upper and lower dies 124, 184.

Referring now to FIGS. 7-10, schematic representations are shown depicting the relative positions of the cross members 300, 302, clutch 304, brake 306, head 308, block 310, eccentric 312, shaft 314, upper die 316, lower die 318, air cushion 320, and stationary base 322 for the lower die 318, during a typical pressing cycle of the press 10.

Figure 7:
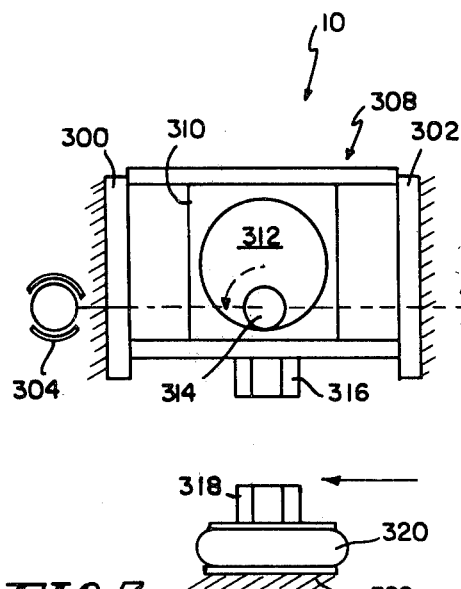
FIG. 7 is a schematic representation of the press when the eccentric is a top dead center.

Referring now to FIG. 7, the press 10 is shown with the shaft 314 and eccentric 312 at top dead center, which is the press 10's initial rest position for changing dies or the like. During the normal pressing cycle when flywheel 72 is rotating, the shaft 314, eccentric 312, block 310, and head 308 do not remain in this raised position but rather continue through this position in a smooth cycle. When initially in this position, the clutch 304 is disengaged from the shaft 314 and the brake 306 is spring-biased to engage shaft 314, thereby preventing shaft 314 from rotating. Eccentric 312 raises the block 310 to the uppermost vertical position in its cycle while laterally centering the block 310 in the head 308. This results in the head 308 being in its uppermost raised position.

Upper die 316 is fully disengaged from lower die 318, and air cushion 320, upon which lower die 318 rests, is in a relatively uncompressed state, having only the weight of the lower die 318 acting to compress it. It is during the press's quarter cycle shown in FIG. 7 when a blank 26 would normally be inserted between upper die 316 and lower die 318.

When the press 10 receives a command to begin a pressing cycle, clutch 304 is air-actuated to engage shaft 314, and thereby begin rotating shaft 314. Simultaneously, brake 306 is air-actuated to release shaft 314 and thereby permit it to rotate in response to the engagement of shaft 314 by clutch 304.

Figure 8:
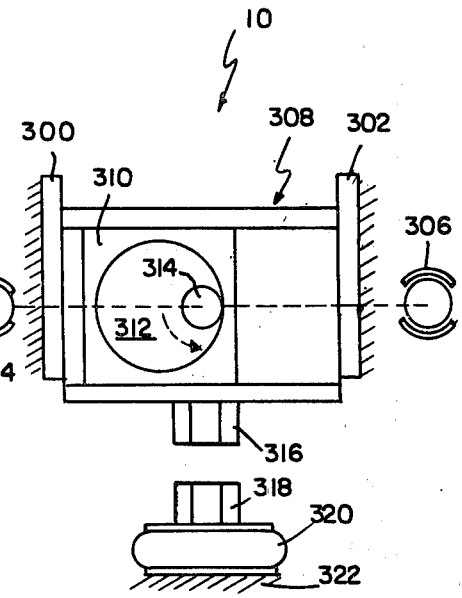
FIG. 8 is a schematic representation of the press when the eccentric is 90° past top dead center.

Referring now to FIG. 8, the press 10 is shown at a position in its pressing cycle wherein the shaft 314 and eccentric 312 are 90° past top dead center. At this position, the clutch 304 remains engaged to shaft 314 and the brake 306 remains released therefrom. The rotational position of the eccentric 312 in the block 310 has caused the block 310 to move laterally and downwardly. As the head 308 is not laterally movable, the block 310 moves laterally within the head 308, without affecting the lateral positioning of the head 308. The head 308 is vertically movable, and will so move in response to vertical movement of block 310. As shown in FIG. 8, the head 308 has responded to the downwardly vertical movement of block 310, by also moving vertically downward. Being mounted upon head 308, the upper die 316 also moves downwardly. The relative positions of the lower die 318 and air cushion 320 remain unchanged.

Approximately 150° past top dead center, the clutch 304 begins its disengagement from shaft 314 simultaneously with the brake 306, commencing its engagement with shaft 314.

Figure 9:
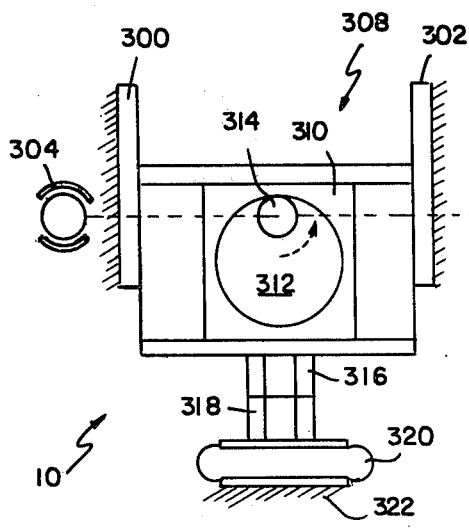
FIG. 9 is a schematic representation of the press when the eccentric is at bottom dead center (180° past top dead center)

Referring now to FIG. 9, the press 10 is shown in its pressing cycle at a point at which the shaft 314 and eccentric 312 are at bottom dead center (180° past top dead center). The clutch 304 is disengaged from shaft 314 and brake 306 is engaged to the shaft 314. Shaft 314 is at rest, and all movement of the eccentric 312, block 310, head 308, upper die 316, lower die 318, and air cushion 320 is stopped.

The above-mentioned components will remain stopped in this position until such time as clutch 304 is air-actuated to engage shaft 314, and the brake 306 is air-actuated to disengage shaft 314. The period of time during which the components remain in this position is the dwell time. As stated above, the dwell time is selectively variable, and is controllable by the operator through the control panel 21.

From its position in FIG. 7 to its position in FIG. 8, the rotation of the eccentric 312 has laterally moved the block 310 to a centered position within head 308 and has vertically moved block 310 downwardly to its lowermost vertical position in the cycle. The vertically downward movement of block 310 has moved head 308 downwardly to its lowermost vertical position in the cycle. Downward movement of upper die 316 has caused it to engage lower die 318, moving lower die 318 in a downwardly vertical direction. The downward movement of lower die 318 has caused air cushion 320 to become compressed between lower die 318 and stationary base 322. The expansive forces exerted by the air cushion 320 to counteract the compressive forces exerted upon the air cushion 320 by the head 308, upper die 316, and lower die 318 maintain the lower die 318 in intimate engagement with upper die 316. Further, these above-mentioned forces aid in providing the press force necessary to form the blank 26 into a formed container 28. The vertical compressibility of air cushion 320 also allows the upper die 316 to engage the lower die 318 at a point in the cycle prior to bottom dead center, and to release the lower die 318 at a point in the cycle past bottom dead center.

Figure 10:
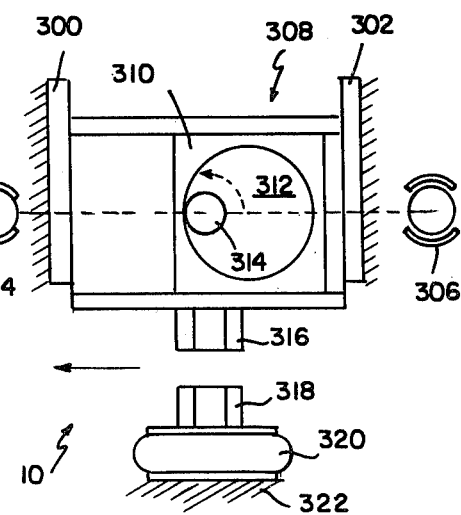
FIG. 10 is a schematic representation of the press when the eccentric is 270° past top dead center.

At the end of the selected dwell time, clutch 304 is air-actuated to re-engage the shaft 314 simultaneously with the air actuation of brake 306 to release shaft 314, thereby causing eccentric 312 to rotate. Referring now to FIG. 10, the press 10 is shown at its point in the pressing cycle wherein the shaft 314 and eccentric 312 are 270° past top dead center. At this stage, the clutch 304 is engaged to rotate the shaft 314, and the brake 306 is actuated to release the shaft 314. The rotational movement of eccentric 312 in block 310 has laterally moved the block 310 within the head, and has moved the head 308 vertically upward through the vertical, upward movement of block 310. Upper die 316 is pulled out of engagement with lower die 318, and air cushion 320 is released from its compressed state. Normally, at some point during this stage of the cycle, air will be applied to the formed container 28 to release it from engagement with the dies 316, 318. Thereafter, the press continues through the various illustrated stages of the cycle until it again comes to dwell at the bottom dead center position shown in FIG. 9.

Referring now to FIGS. 1-3, in operation of the press, unformed blanks 26, which are stacked on entrance conveyor 30, are individually removed from the stack by pickups 44, 46. Blank 26 slides down the entrance conveyor 30 and onto the entrance chute 206, then onto lower die 184 mounted to feeding chute 43, and finally comes to rest on lower die 184. The blank 26 is stopped at, and held onto, lower die 184 by stops 189. The blank 26 is then formed into a container 28 through the engagement of lower die 184 and upper die 124. When dies 124, 184 are released from engagement, air is blown against the formed container 28 to prevent it from sticking to upper die 124. Through the action of gravity, aided by blown air to reduce the friction of the container as it slides down the removing chute 204 and exit chute 208, thereby speeding its travel to the exit conveyor 32, the formed container 28 slides down the lower die 184 mounted removing chute 204, onto the exit chute 208, and finally onto exit conveyor 32. Once on exit conveyor 32, container 28 is moved by conveyor belts 54 toward the end of exit conveyor 32. At an appropriate point, pickups 56, 58 stack the container 28 onto the bottom of a stack of containers 28.

What is claimed is:

1. A press, comprising
 a frame,
 a first die and a base for supporting the first die with respect to the frame,
 a second die and a reciprocally movable head for reciprocally moving the second die with respect to the first die,
 a shaft rotatably mounted within the frame and an eccentric drive means for connecting the shaft to the head,
 a flywheel rotatably mounted to the frame, drive means for rotatably driving the flywheel, a selectively actuable clutch for engaging the flywheel to the shaft, and
 control means for controlling dwell time of the press by the selective actuation of the clutch at a preselected rotation position of the shaft, the control means including means for sensing the position of the shaft and means for actuating the clutch in response to a sensed position of the shaft.

2. The invention of claim 1, further comprising an entry conveyor and an exit conveyor, and means for movably connecting each conveyor to the frame to permit access to the eccentric drive means, first die, and second die.

3. The invention of claim 1, further comprising a brake selectively engageable with said shaft, the brake engaging the shaft simultaneously with the disengagement of the clutch with the shaft.

4. The invention of claim 1, further comprising a brake selectively engageable with said shaft and wherein said brake and clutch are mounted coaxially with said flywheel.

5. The invention of claim 1 wherein said base for resiliently supporting the first die includes a stationary portion, a means for slidably connecting the first die to the stationary portion and an air-filled cushion placed between the stationary portion and the first die.

6. The invention of claim 1 wherein the drive means includes a motor which drives a jackshaft for driving a plurality of individually controllable presses.

7. The invention of claim 1 wherein said clutch is air-actuable and further comprising means for selectively controlling the air flow to the clutch.

8. The invention of claim 7, further comprising a brake selectively engageable with said shaft, the brake being mechanically biased to engage the shaft, and being air-actuable to disengage the shaft.

9. The invention of claim 1 wherein said eccentric drive means moves the second die from a disengaged position wherein the first and second die are out of engagement to an engaged rest position wherein the first and second die are in engagement, and further moves the second die from the engaged rest position back through the disengaged position.

10. The invention of claim 9 wherein said control means controls the length of time the second die is in the engaged rest position.

11. The invention of claim 1, further comprising a communication means between said clutch and said shaft, said communication means serving to actuate the clutch to engage the flywheel to the shaft in response to the position of the shaft.

12. The invention of claim 11 wherein the communication means comprises a gear rotatable with said shaft, a rotary transducer engaging the gear, and means in communication with the rotary transducer for indicating the angular position of the shaft.

13. The invention of claim 1 wherein said eccentric drive comprises a disk, a generally square block having a length and height greater than the diameter of the disk, the disk being received in a hole through the block, the disk and block being received within said head, the head having an interior height and thickness large enough to receive the block but small enough to prevent vertical and longitudinal movement of the block within the head, and an interior length large enough to permit lateral movement of the block within the head.

14. The invention of claim 13 wherein the disk is journaled upon said shaft in a position offset from the center of the disk, said frame including at least a pair of longitudinal grooves adjacent the head, and wherein the head includes longitudinal tongues, disposed on the exterior of the head, which are slidably received by the longitudinal grooves of the frame.

15. The invention of claim 14, further comprising lubricating means to lubricate the disk, block, and head.

16. A press, comprising
 a frame,
 a first die and a base for supporting the first die with respect to the frame,
 a second die and a head for reciprocally moving the second die with respect to the first die,
 a shaft rotatably mounted within the frame and an eccentric drive means for connecting the shaft to the head, the eccentric drive means comprising a block received within the head and a disk received within the block, the rotational movement of the disk being translatable by the block into reciprocal movement of the head to bring the first and second die into and out of engagement,
 a flywheel rotatably mounted to the frame, drive means for rotatably driving the flywheel, a selectively actuable clutch for engaging the flywheel to the shaft, and
 control means for controlling dwell time of the press by the selective actuation of the clutch at a preselected rotation position of the shaft, the control means including means for sensing the position of the shaft and means for actuating the clutch in response to a sensed position of the shaft.

17. The invention of claim 16, further comprising an entry conveyor and an exit conveyor, each being connected to the frame, and means for movably connecting the entry and exit conveyors to permit access to the eccentric drive means, first die, and second die.

18. The invention of claim 16 wherein said base for resiliently supporting the first die includes a stationary portion, a means for slidably connecting the first die to the stationary portion and an air-filled cushion placed between the stationary portion and said first die.

19. The invention of claim 16 wherein the block is generally square and has a length and height greater than the diameter of the disk, the head has an interior height and thickness large enough to receive the block but small enough to prevent vertical and longitudinal movement of the block within the head and an interior length large enough to permit lateral movement of the block within the head.

20. The invention of claim 19 wherein the disk is journaled upon said shaft in a position offset from the center of the disk, said frame includes at least a pair of longitudinal grooves adjacent the head, and wherein the head includes longitudinal tongues, vertically disposed on the exterior of said head, which are slidably received by the longitudinal grooves of the frame.

21. The invention of claim 16, further comprising a brake selectively engageable with said shaft, the brake being mechanically biased to engage the shaft and being air-actuable to disengage the shaft.

22. The invention of claim 21, further comprising means for controlling the length of time the dies are engaged.

23. The invention of claim 21 wherein said brake is in communication with said clutch to disengage the shaft simultaneously with the engagement of the shaft by said clutch.

24. A press for forming sheet material blanks into three-dimensional objects, comprising
a frame,
a first die and a base for supporting the first die with respect to the frame,
a second die and a head for reciprocally moving the second die with respect to the first die,
a shaft rotatably mounted within the frame and an eccentric drive means for connecting the shaft to the head,
drive means including a clutch for rotatably driving the shaft,
an entrance conveyor and an exit conveyor, and means for movably connecting one of the entrance and exit conveyors to the frame to permit movement between an operating position and a position which permits access to the eccentric drive means, first die, and second die, and
control means including means for sensing the position of the shaft and means for actuating the clutch to disengage the shaft in response to a sensed position of the shaft.

25. The invention of claim 24 wherein the exit conveyor includes stacking means for placing the three-dimensional objects formed by the press into stacks and guide means for maintaining the integrity of the stacks of three-dimensional objects so formed, the guide means being adjustably positionable to accommodate for three-dimensional objects of different sizes.

26. The invention of claim 24 wherein the means for movably connecting one of the conveyors to the frame comprises a track means connected to the frame and a track follower means connected to the conveyor.

27. The invention of claim 26 further comprising at least one fluid drive means operatively coupled to the one conveyor for moving the conveyor between the operating position and the position which permits access to the eccentric drive, first die, and second die.

28. The invention of claim 24 wherein the one conveyor is the entrance conveyor, and the entrance conveyor includes means for removing individual blanks from a stack of blanks on the conveyor,
the entrance conveyor being disposed at an inclined angle relative to the ground to allow the blanks removed from the stack to fall toward the first and second dies under the influence of gravity.

29. The invention of claim 24 wherein the one conveyor is the entrance conveyor,
the means for movably connecting one of the conveyors to the frame comprises a track means connected to the frame, a track follower means connected to the conveyor, a fluid drive means operatively coupled to the entrance conveyor for moving the conveyor along the track between the operating position and the position which permits access to the eccentric drive, first die, and second die,
the entrance conveyor including pick-up means for removing individual blanks from a stack of blanks on the conveyor,
the entrance conveyor being disposed at an inclined angle relative to the ground to allow the blanks removed from the stack to fall toward the first and second dies under the influence of gravity.

30. The invention of claim 24 wherein the means for movably connecting one of the conveyors to the frame comprises a hinge supporting the one conveyor and enabling the one conveyor to pivot between an operating position and a position which permits access to the eccentric drive, first die, and second die.

31. The invention of claim 30, further comprising a magnet disposed on one of said one conveyor and frame for securing the conveyor to the frame when the one conveyor is in the operating position, and wherein the hinge has a generally vertical axis to enable said one conveyor to pivot generally laterally between the operating position and the position which permits access to the eccentric drive, first die, and second die.

* * * * *